(12) United States Patent
Choi (10) Patent No.: US 8,582,575 B2
(45) Date of Patent: Nov. 12, 2013

(54) BACKBONE EDGE SWITCHING APPARATUS AND PACKET PROCESSING METHOD OF THE BACKBONE EDGE SWITCHING APPARATUS

(75) Inventor: Chang-Ho Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 181 days.

(21) Appl. No.: 12/873,620

(22) Filed: Sep. 1, 2010

(65) Prior Publication Data

US 2011/0142047 A1 Jun. 16, 2011

(30) Foreign Application Priority Data

Dec. 10, 2009 (KR) ........................ 10-2009-0122269

(51) Int. Cl.
*H04L 12/56* (2011.01)

(52) U.S. Cl.
USPC .......................................................... 370/392

(58) Field of Classification Search
USPC .................. 370/229, 231, 232, 233, 234–238
See application file for complete search history.

(56) References Cited

U.S. PATENT DOCUMENTS

| 6,101,170 | A * | 8/2000 | Doherty et al. ................ 370/255 |
| 6,798,746 | B1 * | 9/2004 | Kloth et al. .................... 370/235 |
| 7,260,518 | B2 * | 8/2007 | Kerr et al. ....................... 703/27 |
| 7,376,085 | B2 | 5/2008 | Yazaki et al. |
| 7,389,358 | B1 | 6/2008 | Matthews et al. |
| 7,401,070 | B2 * | 7/2008 | Kiji ....................................... 1/1 |
| 7,492,714 | B1 * | 2/2009 | Liao et al. ...................... 370/235 |
| 7,496,035 | B1 * | 2/2009 | Sadasivan et al. ............. 370/235 |
| 8,203,953 | B2 * | 6/2012 | Stephenson et al. .......... 370/232 |
| 2002/0057699 | A1 * | 5/2002 | Roberts .................... 370/395.32 |
| 2003/0002438 | A1 * | 1/2003 | Yazaki et al. .................. 370/229 |
| 2004/0170173 | A1 * | 9/2004 | Pan et al. ....................... 370/392 |
| 2004/0213224 | A1 * | 10/2004 | Goudreau ..................... 370/389 |
| 2005/0195816 | A1 * | 9/2005 | Sumiyoshi .................... 370/390 |
| 2005/0220096 | A1 * | 10/2005 | Friskney et al. .............. 370/389 |
| 2006/0114906 | A1 * | 6/2006 | Bowes et al. ................. 370/392 |
| 2007/0091893 | A1 * | 4/2007 | Yazaki et al. ................. 370/392 |
| 2008/0253366 | A1 * | 10/2008 | Zuk et al. ...................... 370/389 |
| 2009/0147683 | A1 | 6/2009 | Mustafa |
| 2009/0168666 | A1 | 7/2009 | Unbehagen et al. |
| 2010/0195645 | A1 * | 8/2010 | Bowes et al. ................. 370/389 |
| 2011/0032942 | A1 * | 2/2011 | Matthews et al. ............. 370/392 |
| 2011/0096676 | A1 * | 4/2011 | Krzanowski .................. 370/252 |

FOREIGN PATENT DOCUMENTS

| JP | 2002-511703 | 4/2002 |
| JP | 2003-078549 | 3/2003 |
| KR | 10-2004-0027175 | 4/2004 |
| KR | 10-0500515 | 7/2005 |

* cited by examiner

*Primary Examiner* — Asad Nawaz
*Assistant Examiner* — Syed S Ali
(74) *Attorney, Agent, or Firm* — Staas & Halsey LLP (57) ABSTRACT

Provided is a backbone edge switching apparatus and a packet processing method of the backbone edge switching apparatus. The backbone edge switching apparatus may generate and manage an integrated service flow by performing a lookup according to multiple layers with respect to an input packet. Accordingly, it is possible to provide various and effective transmission services.

4 Claims, 5 Drawing Sheets

| Control bits | Description |
|---|---|
| 0 | Valid |
| 1 | Match |
| 2 | L2 Enabled |
| 3 | L3 Enabled |
| ... | ... | a
b
c
d

FIG. 4

BACKBONE EDGE SWITCHING APPARATUS AND PACKET PROCESSING METHOD OF THE BACKBONE EDGE SWITCHING APPARATUS

CROSS-REFERENCE TO RELATED APPLICATION

This application claims the benefit of Korean Patent Application No. 10-2009-0122269, filed on Dec. 10, 2009, in the Korean Intellectual Property Office, the disclosure of which is incorporated herein by reference.

BACKGROUND

1. Field of the Invention

The present invention relates to a backbone edge switching apparatus and a packet processing method of the backbone edge switching apparatus, and more particularly, to a backbone edge switching apparatus that may select or additionally use a flow according to a plurality of layers, and thereby may overcome a problem occurring due to a use of a single layer, and a packet processing method of the backbone edge switching apparatus.

2. Description of the Related Art

Ethernet was developed by Robert Metcalfe and David Boggs in early of 1970s. Ethernet standards supporting 100 Mbps, 1 Gbps, and 10 Gbps, starting from 10 Mbps, were completed by an Institute of Electrical and Electronics Engineers (IEEE) 802.3 working group. A standardization supporting 40 Gbps or 100 Gbps is currently underway.

Ethernet was initially developed for a short-range communication. However, as connections of regionally distributed networks and an Internet access become more important, there is an increasing need for a high speed wideband network service.

An Ethernet technology has been disclosed to meet the above need.

Metro Ethernet denotes a network configuration scheme of expanding an existing local area network to a wide area of a metropolitan size. Currently, the Ethernet technology has been expanded from a local area to a metro area, and is aiming to be expanded further to a backbone area. Accordingly, proposed is a method of transforming and expanding a data link layer 2 (L2) switch structure, developed by an existing IEEE802.1 working group, to be suitable for backbone.

An IEEE802.1ag (Connectivity Fault Management) standard for assigning a fault recovery function and a reliability function by alleviating a vulnerable Operation, Administration, and Maintenance (OAM) of Ethernet, an IEEE802.1ah (Provider Backbone Bridge) standard for enhancing a virtual local area network (VLAN) of Ethernet, an IEEE802.1Qag (Provider Backbone Bridge-Traffic Engineering) standard, and the like are being standardized.

Generally, a transmission service of a backbone network may provide a point-to-point connection service in a time division multiplexing (TDM) scheme over a Synchronous Optical Networking (SONET) or Synchronous Digital Hierarchy (SDH) network.

However, due to a fixed speed, a capacity extension cost, and the like, the existing backbone network may be structurally inflexible to receive a new business model.

Accordingly, a method that may provide a point-to-point backbone network transmission service may be sought in a data link L2 and a network layer 3 (L3).

However, a transmission service in the data link L2 corresponds to a frame relay scheme, an Asynchronous Transfer Mode (ATM) scheme, and the like, however, has some problem in an expansibility as a connection-oriented service. In addition, the data link L2 may be inappropriate for transferring sporadically occurring data. Accordingly, a Permanent Virtual Connection (PVC) service may be used to replace a dedicated line of the SONET/SDH network.

A transmission service in the network L3 corresponds to an Internet Protocol (IP)-based scheme, and may be relatively inexpensive compared to the SONET/SDH network and a data link L2 scheme. However, in order to guarantee a quality of service (QoS), the above schemes may need to maintain an average network use rate to be less than or equal to 30%. In addition, the above schemes may not guarantee a strict Service Level Agreement (SLA).

SUMMARY

An aspect of the present invention provides a backbone edge switching apparatus that may supplement a transmission service according to a data link layer and a network layer, and a packet processing method of the backbone edge switching apparatus.

Another aspect of the present invention also provides a backbone edge switching apparatus that may support various transmission services by generating and using a plurality of layer flows according to a packet service, and a packet processing method of the backbone edge switching apparatus.

According to an aspect of the present invention, there is a packet processing method of a backbone edge switching apparatus, including: generating a first flow of a data packet by performing a lookup with respect to particular layer information of the data packet when the data packet is input; determining whether an additional lookup for the data packet is set based on a result of the lookup, and generating a second flow of the data packet by performing the additional lookup with respect to another layer information of the data packet when the additional lookup is set; and determining a transmission flow of the data packet by combining the first flow and the second flow.

The lookup according to the particular layer information may correspond to the lookup using at least one of physical input port information and layer 2 (L2) information.

The lookup according to the other layer information may correspond to the lookup using information associated with an upper layer of a particular layer.

The method may further include determining the first flow as the transmission flow of the data packet when the additional lookup is not set.

The determining may include combining an identifier (ID) of the second flow with an ID of the first flow to thereby determine a combined ID as an ID of the transmission flow of the data packet.

According to another aspect of the present invention, there is provided a backbone edge switching apparatus, including: a first lookup unit to generate a first flow of a data packet by performing a lookup with respect to particular layer information of the data packet when the data packet is input; a second lookup unit to generate a second flow of the data packet by performing an additional lookup with respect to another layer information of the data packet when the additional lookup is set based on a result of the lookup; and an integrated service manager to determine a transmission flow of the data packet by combining the first flow and the second flow.

The lookup according to the particular layer information may correspond to the lookup using at least one of physical input port information and L2 information.

The lookup according to the other layer information may correspond to the lookup using information associated with an upper layer of a particular layer.

When the additional lookup is not set, the integrated service manager may determine the first flow as the transmission flow of the data packet.

The integrated service manager may combine an ID of the second flow with an ID of the first flow to thereby determine a combined ID as an ID of the transmission flow of the data packet.

EFFECT

According to embodiments of the present invention, a flow of a packet to be transmitted may be generated and used according to existing particular layer information, for example, physical input port information and layer 2 (L2) information, and according to additional another layer information, for example, upper layer information such as a layer 3 (L3). Accordingly, it is possible to variously and effectively perform a path management and protection procedure for each flow, a quality of service (QoS) management, a statistics management, a connection admission control, and a system operation and management.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described with reference to the accompanying drawings. When it is determined detailed description related to a related known function or configuration they may make the purpose of the present invention unnecessarily ambiguous in describing the present invention, the detailed description will be omitted here.

Also, terms used herein are defined to appropriately describe the exemplary embodiments of the present invention and thus may be changed depending on a user, the intent of an operator, or a custom. Accordingly, the terms must be defined based on the following overall description of this specification.

Figure 1:
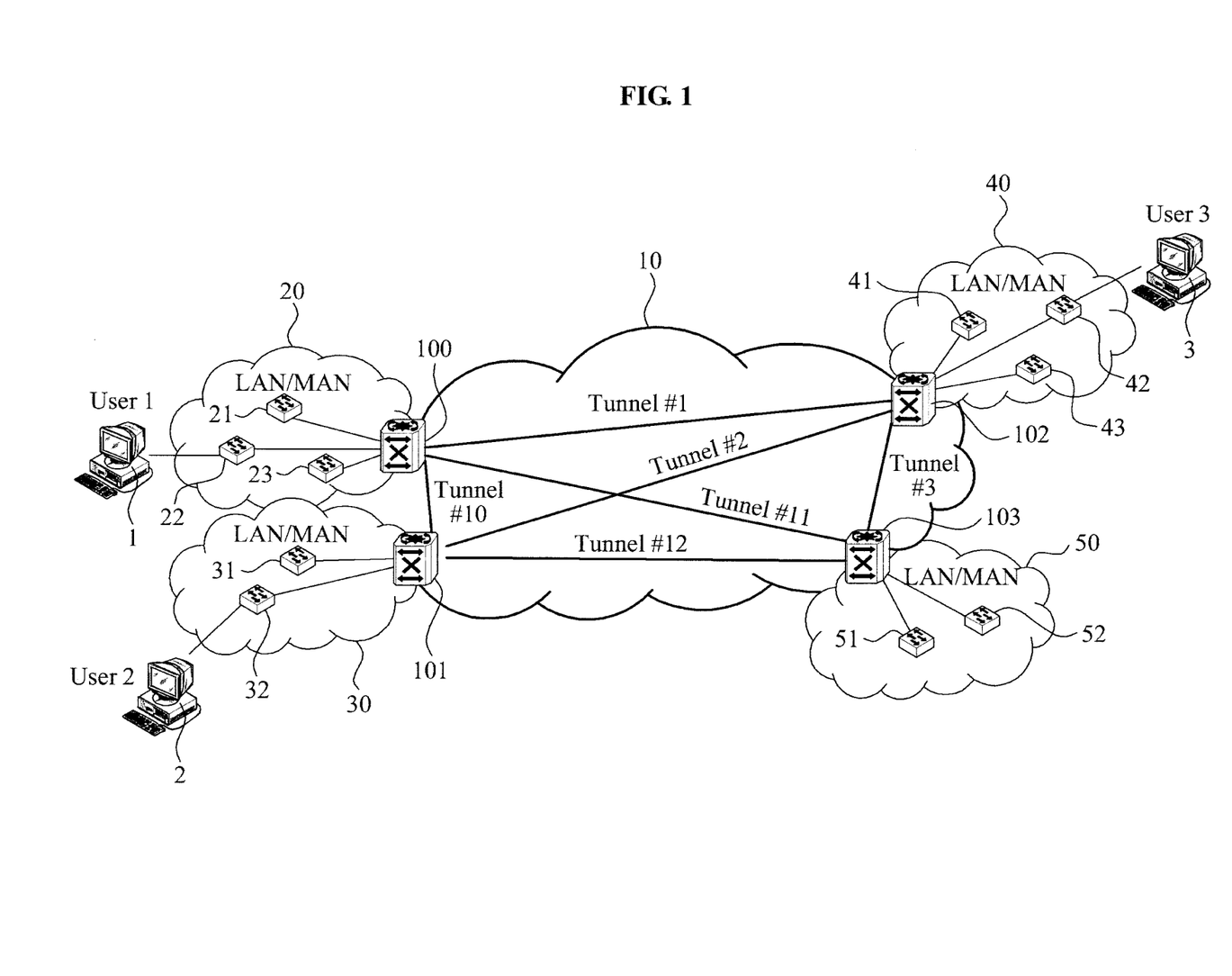
FIG. 1 is a diagram illustrating a structure of a packet transmission network system including a backbone edge switching apparatus according to an embodiment of the present invention.

FIG. 1 is a diagram illustrating a structure of a packet transmission network system including a backbone edge switching apparatus according to an embodiment of the present invention.

Referring to FIG. 1, the packet transmission network system may include a provider backbone network 10, and a plurality of local area networks (LANs)/metro area networks (MANs) 20, 30, 40, and 50.

To transfer a packet to a plurality of users (user 1, user 2, and user 3) 1, 2, and 3, the LANs/MANs 20, 30, 40, and 50 may provide communication resources such as access switches 21, 22, 23, 31, 32, 41, 42, 43, 51, and 52, and may be generally provided in a star form or a hierarchical form.

The provider backbone network 10 may support a connection with the plurality of LANs/MANs 20, 30, 40, and 50 using a plurality of backbone edge switching apparatuses 100, 101, 102, and 103. Each of the backbone edge switching apparatuses 100, 101, 102, and 103 may switch a packet input from the respective corresponding LANs/MANs 20, 30, 40, and 50 via corresponding tunnels.

According to an embodiment of the present invention, a backbone edge switching apparatus may generate and allocate a flow by employing an additional layer according to a service of an input packet, and may transfer the packet to a subsequent path according to the allocated flow.

Figure 2:
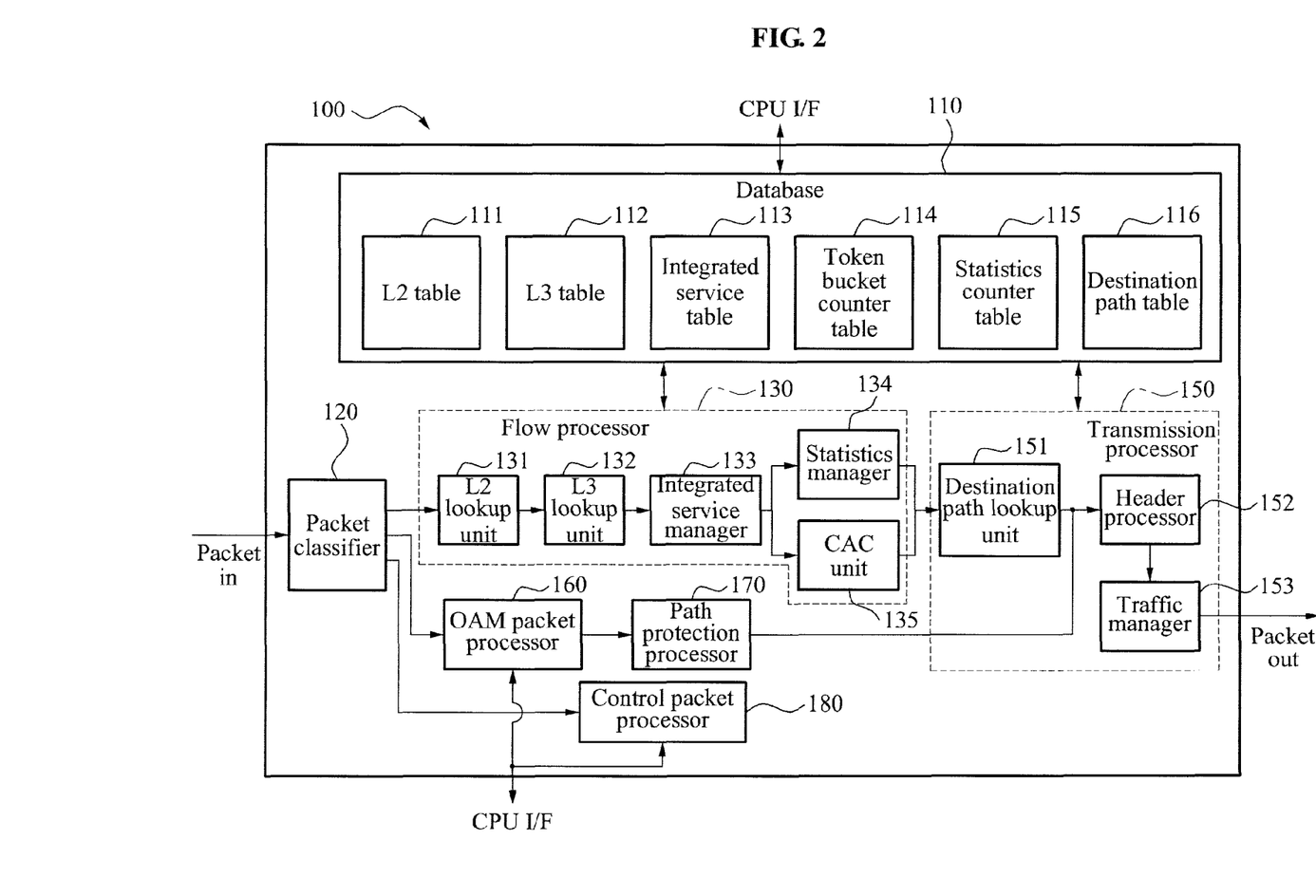
FIG. 2 is a block diagram illustrating a configuration of a backbone edge switching apparatus according to an embodiment of the present invention.

FIG. 2 is a block diagram illustrating a configuration of a backbone edge switching apparatus 100 according to an embodiment of the present invention.

Referring to FIG. 2, the backbone edge switching apparatus 100 may include a database 110, a packet classifier 120, a flow processor 130, a transmission processor 150, an Operation, Administration, and Maintenance (OAM) packet processor 160, a path protection processor 170, and a control packet processor 180.

The database 110 may be a recording medium to store information for packet processing.

The database 110 may store a layer 2 (L2) table 111, a layer 3 (L3) table 112, an integrated service table 113, a token bucket counter table 114, a statistics counter table 115, and a destination path table 116.

The L2 table 111 may store, for each flow, destination information, service type information, QoS information, and the like according to an L2 of the provider backbone network 10 transferred from an upper control channel (not shown) via a Central Processing Unit (CPU) interface (not shown). The L3 table 112 may also store, for each flow, destination information, service type information, QoS information, and the like according to an upper layer including an L3 of the provider backbone network 10.

The integrated service table 113 may store flow information generated by the flow processor 130, a token bucket counter index, a statistics counter index, and a flow identifier (ID). The token bucket counter table 114 may store a token bucket counter for a connection admission control (CAC) for each flow. The statistics counter table 115 may store a statistics counter for a statistical value for each flow.

Also, the destination path table 116 may store a flow ID generated based on a result of lookup of the flow processor 130 with respect to the L2 and/or the upper layer lookup including the L3, path information for each flow, and protection procedure information.

The packet classifier 120 may extract header information from an Ethernet frame that is a packet input from a LAN/MAN.

The packet classifier 120 may classify a type of the packet based on a type field of the header information, a transmission address, a destination address, an input port, and the like.

When the packet corresponds to a data packet, the packet classifier 120 may transfer the packet to the flow processor 130. When the packet corresponds to a control packet, the packet classifier 120 may transfer the packet to the control packet processor 180. When the packet corresponds to an OAM packet, the packet classifier 120 may transfer the packet to the OAM packet processor 160.

The flow processor 130 may generate a first flow of the packet and a first flow ID by performing a lookup with respect to particular layer information of the packet. When an additional lookup with respect to the packet is set, the flow processor 130 may generate a second flow of the packet and a second flow ID by performing the additional lookup with respect to another layer information of the packet.

In this instance, the lookup according to the particular layer information may correspond to the lookup using at least one of physical input port information and L2 information, and thus hereinafter description will be made based on an L2.

Also, another layer may correspond to an upper layer of the L2 such as an L3 of the packet and thus description will be made based on the L3.

The flow processor 130 may allocate the first flow of the packet and the first flow ID based on a result of the lookup, and may allocate the second flow of the packet and the second flow ID based on a result of the additional lookup. The flow processor 130 may combine allocated flows and flow IDs and thereby store and manage the combined flows and flow IDs in the integrated service table 113.

For this, the flow processor 130 may include an L2 lookup unit 131, an L3 lookup unit 132, an integrated service manager 133, a statistics manager 134, and a CAC unit 135.

In this instance, the L2 lookup unit 131 corresponds to a first lookup unit and may look up the L2 table 111 using physical input port information and L2 information of the packet (for example, a Media Access Control (MAC) address, a virtual local area network (VLAN) ID, and the like), and may allocate the first flow of the packet and the first flow ID (hereinafter, "a flow and a flow ID according to the L2) using the lookup result.

Based on the lookup result of the L2 table 111, the L2 lookup unit 131 may generate predetermined control bits with respect to whether the additional lookup of the packet is set, a destination, QoS information, a service type, and a post-packet processing.

Figure 3:
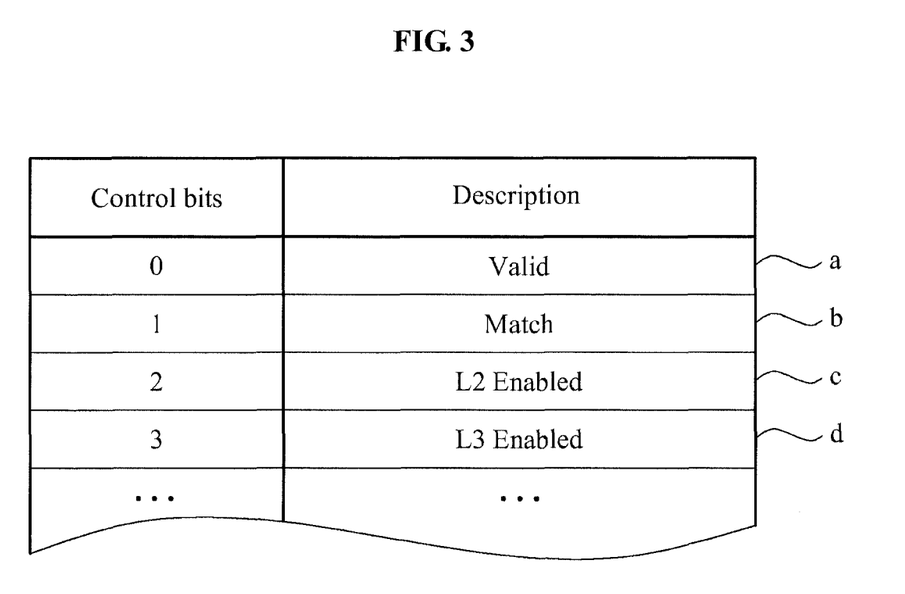
FIG. 3 is a diagram illustrating an example of control bits occurring due to a layer 2 (L2) lookup unit of FIG. 2.

The control bits may be configured as shown in FIG. 3.

Referring to FIG. 3, the control bits may include a $0^{th}$ bit a indicating whether the packet is valid, a first bit b indicating whether the lookup results matches, a second bit c designating a default lookup of the packet corresponding to a lookup according to L2 information, a third bit d designating an additional lookup of the packet corresponding to a lookup according to upper layer information including L3, and the like. Although bits followed by the third bit d are omitted in FIG. 3, it will be apparent to those skilled in the art that the bits may be added and be variously modified.

The L3 lookup unit 132 may determine whether the additional lookup is set based on the control bits generated by the L2 lookup unit 131.

When the additional lookup is set, the L3 lookup unit 132 may look up the L3 table 112 based on upper layer information including the L3 of the packet, and may generate a flow and a flow ID according to an upper layer including the L3 of the packet and combine the generated flow and flow ID with the flow and the flow ID generated by the L2 lookup unit 131.

For a destination of the packet, QoS information, a service type, and a subsequent packet processing, the L3 lookup unit 132 may generate predetermined other control bits (not shown). The other control bits generated by the L3 lookup unit 132 may be set to have a relatively high priority than the control bits generated by the L2 lookup unit 131, and thereby be stored in the integrated service table 113.

The integrated service manager 133 may combine the flow according to the L3 with the flow according to the L2 and thereby determine the combined flow as a transmission flow of the packet. The integrated service manager 133 may combine the flow ID according to the L3 with the flow ID according to the L2 and thereby determine the combined flow ID as an ID corresponding to the transmission flow of the packet.

In this instance, the integrated service manager 133 may allocate the transmission flow of the packet by updating the flow according to the L3 for each same item of the flow according to the existing L2.

Also, the integrated service manager 133 may allocate the ID of the transmission flow of the packet by inserting the flow ID according to the L3 into a subsequent bit of the flow ID according to the L2. The ID of the transmission flow may be configured as shown in FIG. 4.

Figure 4:
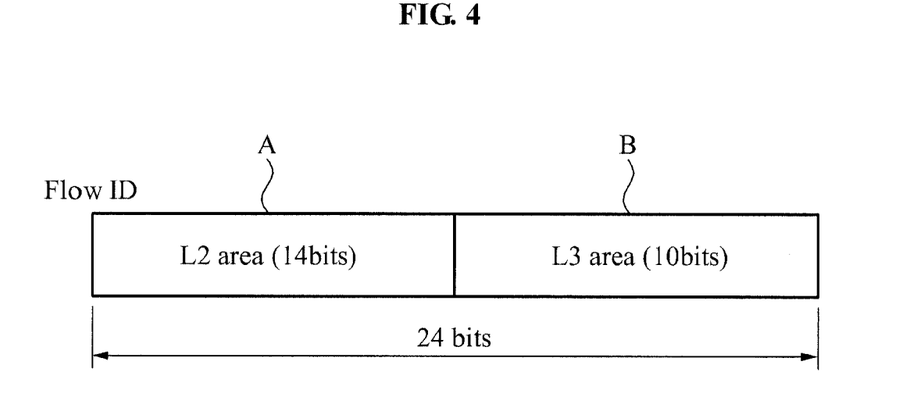
FIG. 4 is a diagram illustrating an example of an identifier (ID) of a transmission flow corresponding to a packet according to an embodiment of the present invention.

Referring to FIG. 4, the ID of the transmission flow may include an L2 area A storing the flow ID according to the L2 and an L3 area B storing the flow ID according to the L3.

Specifically, the integrated service manager 133 may insert, into the L2 area A, the flow ID according to the L2 generated by the L2 lookup unit 131, and may insert, into the L3 area B, the flow ID according to the L3 generated by the L3 lookup unit 132.

Consequently, when the additional lookup is not performed with respect to the packet, the ID of the transmission flow may include only the flow ID according to the L2. Conversely, when the additional lookup is performed, the ID of the transmission flow may include both the flow ID according to the L2 and the flow ID according to the L3.

In this instance, the ID of FIG. 4 includes a total of 24 bits and is configured to include the L2 area A of 14 bits and the L3 area of 10 bits. However, it is only an example and thus the present invention is not limited thereto.

The integrated service manager 133 may look up the integrated service table 113 using the flow IDs of the packet generated by the L2 lookup unit 131 and the L3 lookup unit 132.

When the lookup of the integrated service table 113 succeeds, a flow having the same ID as the flow ID may exist. Accordingly, the integrated service manager 133 may update an existing entry without adding a new entry and then may obtain a token bucket counter index and a statistics counter index as a lookup result.

Conversely, when the lookup of the integrated service table 113 does not succeed, the flow having the same ID as the flow ID of the packet may not exist. Accordingly, the integrated service manager 133 may store, in the integrated service table 113, the flow and the flow ID according to the L2 of the packet and the flow and the flow ID according to the L3 of the packet. The integrated service manager 133 may newly allocate the statistics counter index and the token bucket counter index and thereby store the same in the integrated service table 113.

Also, the statistics manager 134 may receive a statistics counter index obtained as the lookup result of the integrated service manager 133, and may increase a counter value of the statistic counter index.

The CAC unit 135 may look up the token bucket counter table 114 by obtaining the index of the token bucket counter from the lookup result of the integrated service manager 133.

The CAC unit 135 may perform a CAC function of the packet based on the lookup result of the token bucket counter table 114.

To perform the CAC function, the CAC unit 135 may measure a bandwidth and a burst level with respect to the flow of the packet or a service of each flow group, and may set predetermined bits depending on whether the measured bandwidth and the burst level exceed a predetermined threshold.

Since the CAC unit 135 sets the bits to be a predetermined value, a flow exceeding the predetermined threshold may be abolished during a transmission process.

The transmission processor 150 may function to transmit a packet input via the flow processor 140 to a path of a flow corresponding to the packet. For this, the transmission processor 150 may include a destination path lookup unit 151, a header processor 152, and a traffic manager 153.

The destination path lookup unit 151 may look up the destination path table 116 using flow IDs allocated to the packet by the L2 lookup unit 131 and the L3 lookup unit 132, and may transfer, to the header processor 152, path information for each flow and protection procedure information as a lookup result.

The header processor 152 may add an additional header to the packet using path so that the packet may be transmitted to a backbone edge switching apparatus of a destination, based on path information transferred from the destination path lookup unit 151.

To guarantee a service of the packet, the traffic manager 153 may select and abolish a packet exceeding a predetermined bandwidth, based on QoS information stored in the integrated service table 113 of the database 110. Also, the traffic manager 153 may designate and manage a threshold bandwidth for each flow.

To detect an abnormality in a path, the OAM packet processor 160 may periodically transmit and receive a Continuity Check Message (CCM) packet according to an Institute of Electrical and Electronics Engineers (IEEE) 802.1ag standard. The OAM packet processor 160 may transmit, to an upper processor (not shown) via a CPU interface, other packets, for example, a Link Trace Message (LTM), a Link Trace Reply (LTR), a Loop Back Message (LBM), a Loop Back Reply (LBR), and the like, and may receive a processing result.

When a path abnormality signal is received from the OAM packet processor 160 or the upper processor, the path protection processor 170 may switch a currently servicing path to a protection path.

When the packet classifier 120 classifies a currently received packet into a control packet, the control packet processor 180 may transfer the packet to the upper processor via the CPU interface so that a function according to a control of the packet may be executed.

Figure 5:
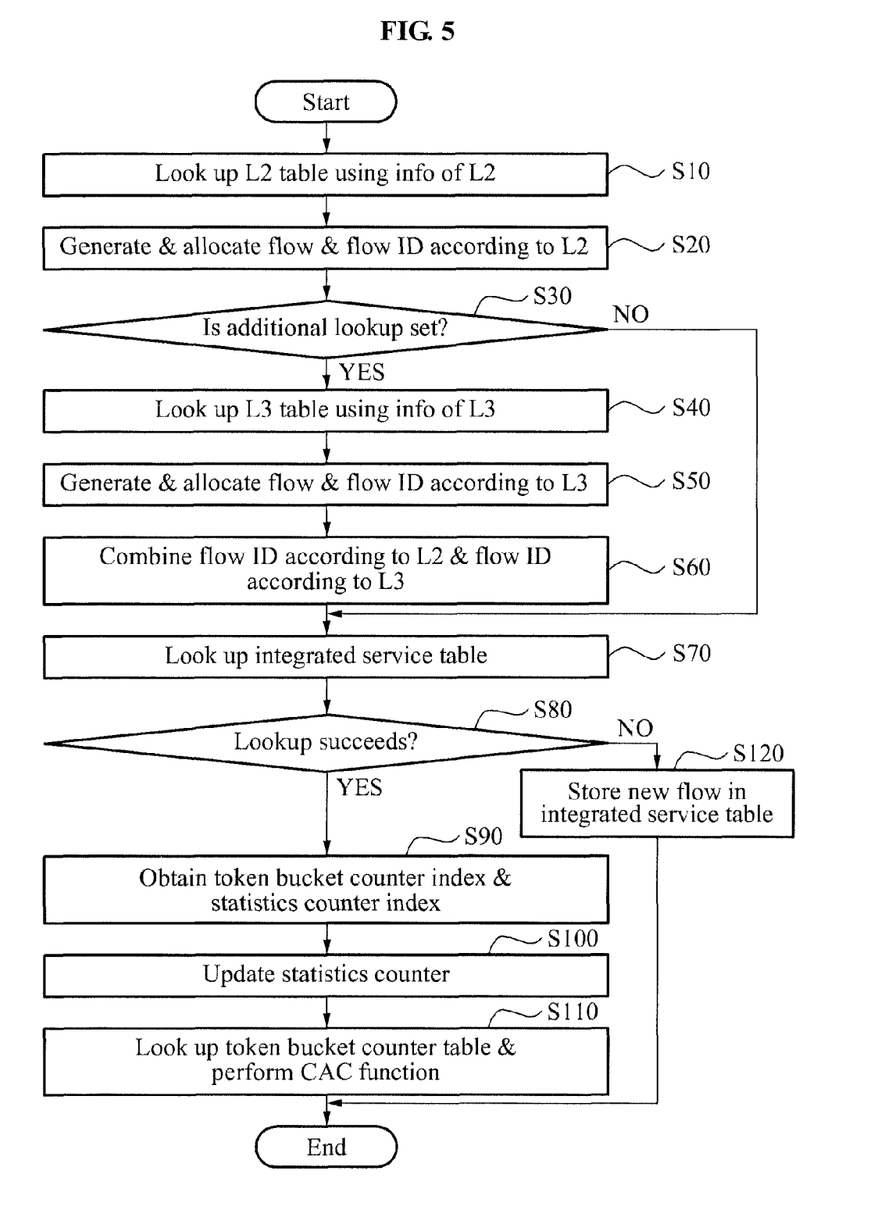
FIG. 5 is a flowchart illustrating a method of operating a flow processor of FIG. 2 according to an embodiment of the present invention.

FIG. 5 is a flowchart illustrating a method of operating the flow processor 130 of FIG. 2.

When a packet received from an outside is determined as a data packet by the packet classifier 120, the received packet may be transferred to the flow processor 130.

Accordingly, the L2 lookup unit 131 of the flow processor 130 may perform a lookup for generating a flow of the transferred packet. The L3 lookup unit 132 may allocate the flow of the packet and a flow ID by performing an additional lookup of the packet based on a lookup result of the L2 lookup unit 131.

Referring to FIG. 5, in operation S10, the L2 lookup unit 131 may look up the L2 table 111 based on physical input port information of the transferred packet and L2 information, for example, a MAC address, a VLAN ID, and the like.

A lookup result of operation S10 may include information regarding whether an additional look of the packet is set, a destination address, a service type, a QoS, a token bucket counter index, and the like.

In operation S20, the L2 lookup unit 131 may generate and allocate a flow of the packet and a flow ID based on the lookup result of operation S10.

In operation S30, the L3 lookup unit 132 may determine whether the additional lookup of the packet is set in a service of the packet based on the lookup result of operation S10.

When the additional lookup is determined to be set in operation S30, the L3 lookup unit 132 may look up the L3 table 112 based on upper layer information including an L3 of the packet in operation S40.

A lookup result of operation S40 may include a destination address of the packet, a service type, a QoS, a token bucket counter index, and the like.

In operation S50, the L3 lookup unit 132 may generate and allocate a flow and a flow ID according to an L3 of the packet based on the lookup result of operation S40.

In operation S60, the integrated service manager 133 may combine the allocated flow ID with the flow ID according to the L2 of the packet and thereby determine the combined flow ID as an ID of a transmission flow of the packet.

In operation S70, the integrated service manager 133 may look up the integrated service table 114 using the integrated flow ID.

In operation S80, the integrated service manager 133 may determine whether the lookup of operation S70 succeeds.

When the lookup is determined to succeed in operation S80, the integrated service manager 133 may obtain a token bucket counter index and a statistics counter index corresponding to the packet in operation S90.

In operation S100, the statistics manager 134 may increase a value of a statistics counter corresponding to the statistics counter index obtained in operation S70.

In operation S110, the CAC unit 135 may look up the token bucket counter table 114 using the index of the token bucket counter, and perform a CAC function of the packet.

Conversely, when the lookup is determined to fail in operation S80, the integrated service manager 133 may combine the allocated flow with the flow according to the L2 of the packet and determine the combined flow as the transmission flow of the packet, and store the determined transmission flow of the packet in the integrated service table 114 in operation S120.

According to an embodiment of the present invention, an backbone edge switching apparatus may perform a lookup with respect to particular layer information of an input data packet, and perform an additional look with respect to another layer information of the packet depending on whether the additional lookup is set, and thereby may generate an integrated flow according to at least one layer of the packet. In particular, in the case of the packet needing the additional lookup, the backbone edge switching apparatus may generate an integrated flow according to a plurality of layers by performing the lookup according to another layer information corresponding to an upper layer including an L3, and thereby transmit the packet. Accordingly, it is possible to transmit the packet using various paths.

The above-described embodiments of the present invention may be recorded in computer-readable media including program instructions to implement various operations embodied by a computer. The media may also include, alone or in combination with the program instructions, data files, data structures, and the like.

Examples of program instructions may be specially designed for the invention or may be known and be available to those skilled in the computer software.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A packet processing method of a backbone edge switching apparatus, comprising:
generating a first flow of a data packet by performing a lookup with respect to particular layer information of the data packet when the data packet is input;
determining whether an additional lookup for the data packet is set based on a result of the lookup, and generating a second flow of the data packet by performing the additional lookup with respect to another layer information of the data packet when the additional lookup is set; and
determining a transmission flow of the data packet by combining the first flow and the second flow and concatenating flow IDs of the first and second flow
wherein the determining a transmission flow comprises combining an identifier (ID) of the second flow with an ID of the first flow to thereby determine a combined ID as an ID of the transmission flow of the data packet wherein the lookup according to the other layer information corresponds to the lookup using information associated with an upper layer of a particular layer wherein the lookup according to the particular layer information corresponds to the lookup using at least one of physical input port information and layer 2 (L2) information.

2. The method of claim 1, further comprising:
determining the first flow as the transmission flow of the data packet when the additional lookup is not set.

3. A backbone edge switching apparatus, comprising:
a processor, comprising:
a first lookup unit to generate a first flow of a data packet by performing a lookup with respect to particular layer information of the data packet when the data packet is input;
a second lookup unit to generate a second flow of the data packet by performing an additional lookup with respect to another layer information of the data packet when the additional lookup is set based on a result of the lookup; and
an integrated service manager to determine a transmission flow of the data packet by combining the first flow and the second flow and concatenating flow IDs of the first and second flow
wherein the integrated service manager combines an ID of the second flow with an ID of the first flow to thereby determine a combined ID as an ID of the transmission flow of the data packet wherein the lookup according to the particular layer information corresponds to the lookup using at least one of physical input port information and L2 information wherein the lookup according to the other layer information corresponds to the lookup using information associated with an upper layer of a particular layer.

4. The backbone edge switching apparatus of claim 3, wherein when the additional lookup is not set, the integrated service manager determines the first flow as the transmission flow of the data packet.

* * * * *